United States Patent
Beierl et al.

(10) Patent No.: US 7,717,461 B2
(45) Date of Patent: May 18, 2010

(54) MOTOR VEHICLE WITH A DISPLACEABLE ROOF CONFIGURATION AND A ROLLOVER PROTECTION ELEMENT

(75) Inventors: Dominik Beierl, Korntal-Münchingen (DE); Angelo Bronda, Weissach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 12/334,987

(22) Filed: Dec. 15, 2008

(65) Prior Publication Data

US 2009/0152854 A1 Jun. 18, 2009

(30) Foreign Application Priority Data

Dec. 18, 2007 (DE) .................. 10 2007 061 014

(51) Int. Cl.
 *B60R 21/13* (2006.01)
(52) U.S. Cl. .................................... 280/756
(58) Field of Classification Search ............ 280/751, 280/753, 756
 See application file for complete search history.

(56) References Cited

U.S. PATENT DOCUMENTS

| 7,198,294 | B2 |   | 4/2007  | Welch          |         |
|-----------|----|---|---------|----------------|---------|
| 7,407,188 | B2 |   | 8/2008  | Wildig et al.  |         |
| 7,416,214 | B2 | * | 8/2008  | Hermann et al. | 280/756 |
| 2005/0082808 | A1 | * | 4/2005 | Wildig et al. | 280/756 |
| 2006/0097499 | A1 | * | 5/2006 | Welch         | 280/756 |
| 2006/0131862 | A1 | * | 6/2006 | Hermann et al.| 280/756 |
| 2008/0309126 | A1 | * | 12/2008 | Beierl et al. | 296/216.01 |

FOREIGN PATENT DOCUMENTS

| DE | 20003256 U1 | 7/2001 |
| EP | 1127751 A1  | 8/2001 |
| EP | 1510412 A1  | 3/2005 |
| EP | 1652736 A1  | 5/2006 |

OTHER PUBLICATIONS

German Search Report dated Feb. 4, 2009.

* cited by examiner

*Primary Examiner*—Paul N Dickson
*Assistant Examiner*—Joseph Rocca

(57) ABSTRACT

A motor vehicle with a roof configuration which can be displaced between a closed position and open position and has a roof skin. At least one rollover protection element which, in a retracted inoperative position, is concealed under a covering, is moveable, by displacing the covering, into an extended protective position and has a manipulation element for the roof skin in order to be able to penetrate the roof skin to reach the protective position. In order to be able to reliably extend the rollover protection element, it is provided that, on its lower side facing the rollover protection element, the covering has a contact structure which prevents the manipulation element from making contact with the covering.

9 Claims, 2 Drawing Sheets

MOTOR VEHICLE WITH A DISPLACEABLE ROOF CONFIGURATION AND A ROLLOVER PROTECTION ELEMENT

CROSS-REFERENCE TO RELATED APPLICATION

This application claims the priority, under 35 U.S.C. §119, of German application DE 10 2007 061 014.0, filed Dec. 18, 2007; the prior application is herewith incorporated by reference in its entirety.

BACKGROUND OF THE INVENTION

Field of the Invention

The invention is based on a motor vehicle with a displaceable roof configuration and a rollover protection element.

A motor vehicle of this generic type is known from published, European patent application EP 1 510 412 A1 corresponding to U.S. Pat. No. 7,407,188. As the roof configuration which can be displaced between the closed position and open position, it has a convertible top which has a roof skin which, in particular, is provided with a rear window. The vehicle furthermore contains a rollover protection element which, in a retracted inoperative position, lies under a covering. The rollover protection element which can be extended into a protective position displaces the covering during its extension movement and can thus come into contact in a pulse-like manner with the roof skin, in particular with the rear window, and therefore the roof skin is manipulated in such a manner that the rollover protection element can penetrate the plane of the roof skin. For this purpose, a manipulation element is disposed on the rollover protection element, the manipulation element being configured as a pointy spike which, during the extension movement of the rollover protection element, strikes against the rear window in the roof skin and, in the process, destroys it. The extended protective position of the rollover protection element is therefore located above the roof skin.

SUMMARY OF THE INVENTION

It is accordingly an object of the invention to provide a motor vehicle with a displaceable roof configuration and a rollover protection element that overcomes the above-mentioned disadvantages of the prior art devices of this general type, in which the rollover protection element can be reliably moved from its inoperative position into its extended protective position.

With the foregoing and other objects in view there is provided, in accordance with the invention, a motor vehicle. The motor vehicle contains a covering, a roof configuration displaceable between a closed position and an open position and having a roof skin; and at least one rollover protection element which, in a retracted inoperative position, and concealed under the covering, is moveable, by displacing the covering, into an extended protective position. The rollover protection element has a manipulation element for penetrating the roof skin to reach the extended protective position. The covering has a lower side facing the rollover protection element and a contact structure for preventing the manipulation element from making contact with the covering disposed on the lower side.

The advantages primarily obtained with the invention can be seen in that contact of the manipulation element with the covering is prevented by the contact structure fitted to the lower side of the covering, as a result of which, when the rollover protection element is extended, catching of the manipulation element on the covering is avoided. It is therefore ensured that the manipulation element is not slowed down on the lower side of the covering, which could possibly lead to the rollover protection element failing.

In accordance with an added feature of the invention, the covering and the contact structure are produced as a single piece part.

In accordance with a further feature of the invention, the contact structure has at least one projection which projects from the lower side of the covering in a direction of the rollover protection element.

In accordance with another feature of the invention, the rollover protection element has an upper side, and the manipulation element is configured as a fixed spike on the upper side of the rollover protection element.

In accordance with an additional feature of the invention, the manipulation element is attached to the rollover protection element in a laterally offset manner in relation to the contact structure. This counteracts the above-mentioned catching between the covering and the manipulation element.

In a development of the invention, the rollover protection element is arranged at an angle in relation to an imaginary vertical which runs parallel to the vertical axis of the vehicle. In other words, the rollover protection element extends obliquely upward into its protective position.

In a particularly preferred embodiment, the manipulation element is arranged at the highest point on the rollover protection element such that it is ensured that it reliably comes into contact with the roof skin in order to be able to appropriately manipulate the latter.

In accordance with another further feature of the invention, the contact structure is disposed approximately centrally with respect to the rollover protection element.

In accordance with a concomitant feature of the invention, the rollover protection element is at least one roll bar.

Other features which are considered as characteristic for the invention are set forth in the appended claims.

Although the invention is illustrated and described herein as embodied in a motor vehicle with a displaceable roof configuration and a rollover protection element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
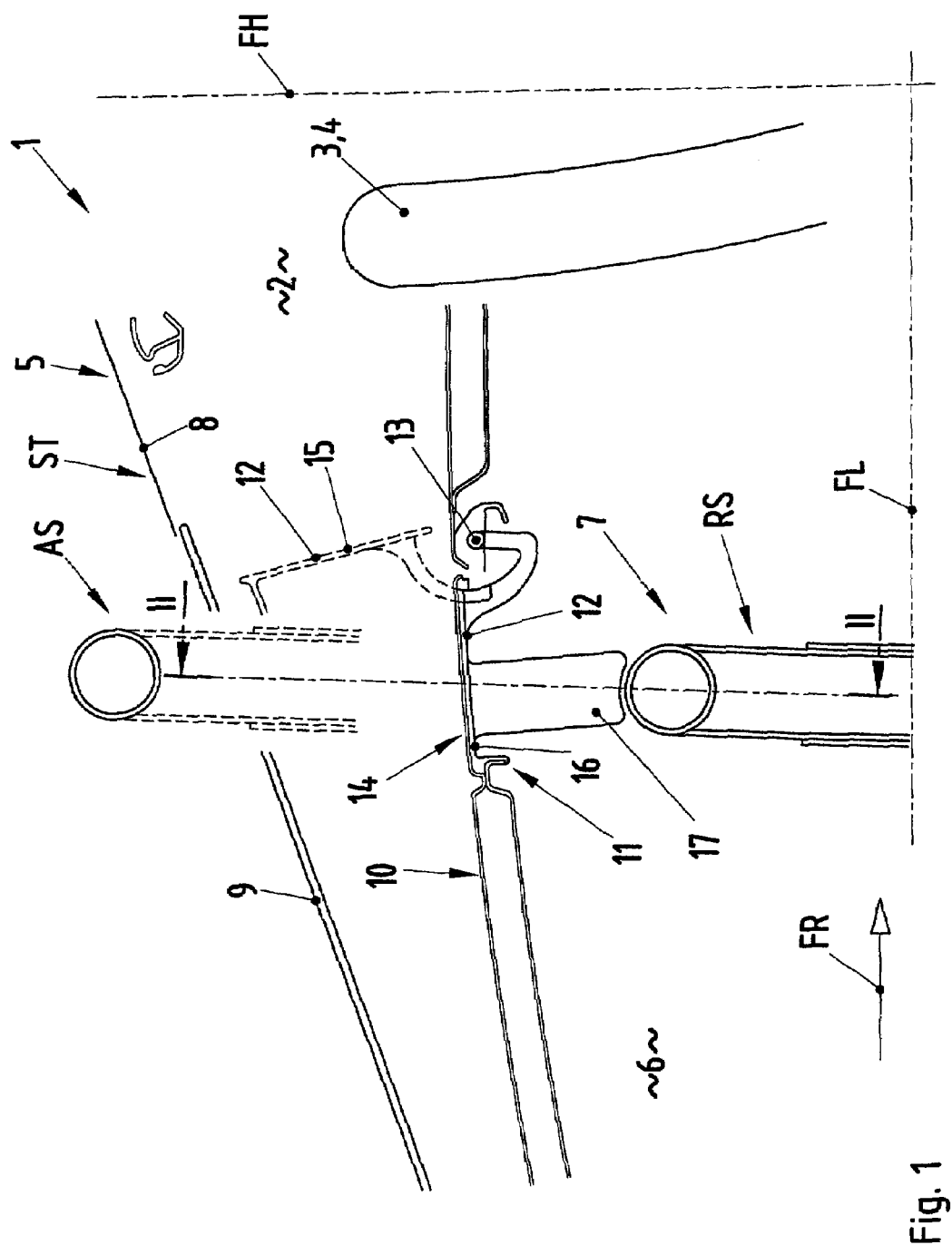
FIG. 1 is a diagrammatic, sectional view showing part of a motor vehicle with a roof configuration and a rollover protection element.
Figure 2:
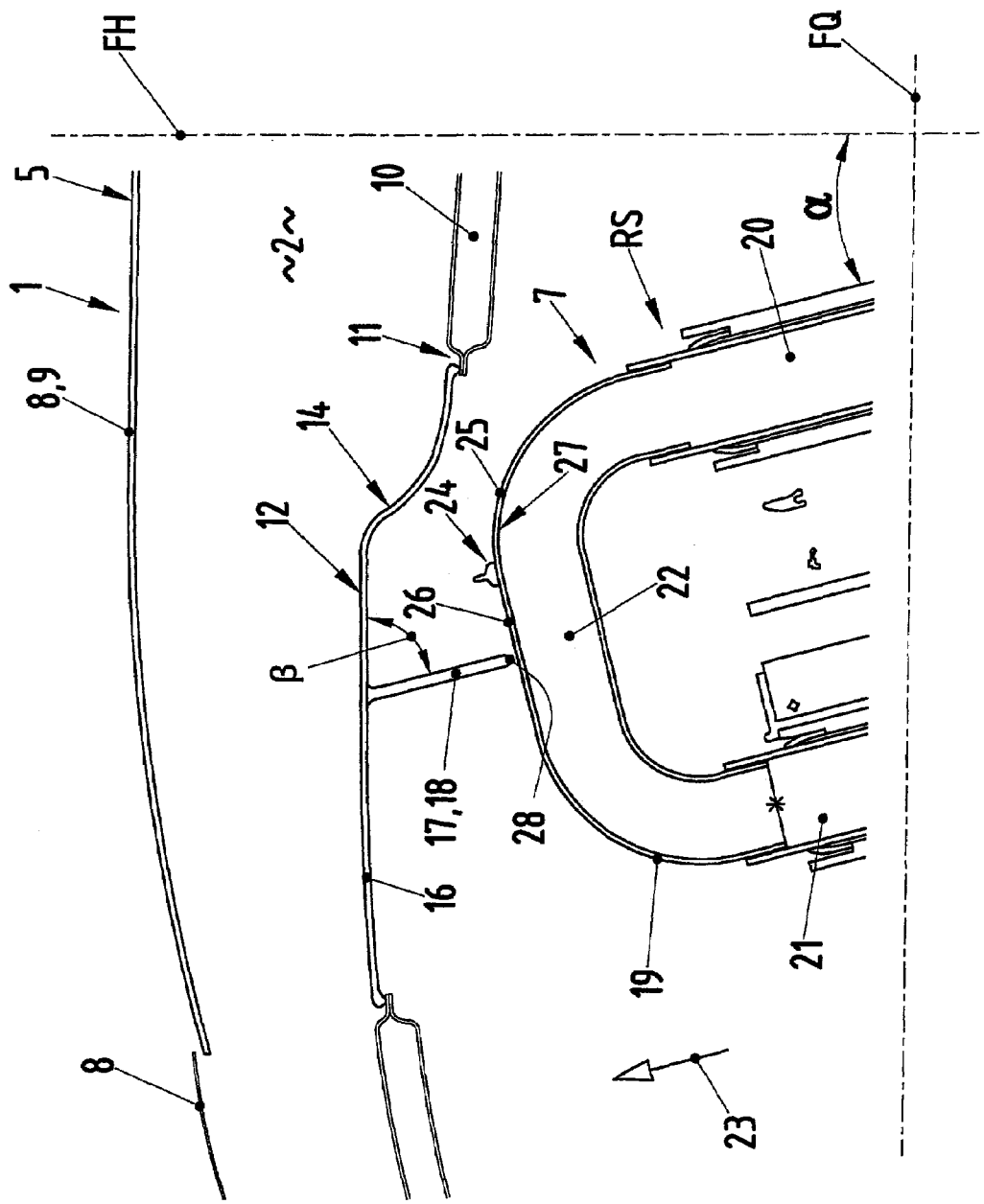
FIG. 2 is a diagrammatic, section view being parallel to a transverse axis of the vehicle and taken along the line II-II in FIG. 1.

Referring now to the figures of the drawing in detail and first, particularly, to FIG. 1 thereof, there is shown part of a motor vehicle 1 in a sectioned side view. By definition, the motor vehicle 1 has a longitudinal axis FL of the vehicle running in the longitudinal direction of the vehicle, an arrow FR indicating the customary forward direction of travel, i.e. pointing from the non-illustrated vehicle rear in the direction of the vehicle front. By definition, the motor vehicle 1 furthermore has a vertical axis FH of the vehicle, constituting a vertical. FIG. 2 shows, by definition, a transverse axis FQ of the vehicle, which axis extends along a width of the vehicle.

The motor vehicle 1 has a vehicle interior 2 which could also be referred to as the passenger compartment. In the vehicle interior, only a backrest 3 of a vehicle seat 4 is shown in FIG. 1. The motor vehicle 1 can be configured with one or with two rows of seats. The vehicle interior 2 can be spanned by a displaceable roof configuration 5, a part of which is shown in FIG. 1 in a closed position ST. In an open position (not shown here), the roof configuration 5 is put away in a rear storage compartment 6. In a particularly preferred embodiment, the roof configuration 5 is therefore provided as a top for the motor vehicle 1 which is configured as a convertible.

A rollover protection element 7 is arranged behind the vehicle seat 4, the rollover protection element 7 is able to be moved from a retracted inoperative position RS into an extended protective position AS in which it protrudes over a roof skin 8 of the roof configuration 5 by penetrating the roof skin 8 by manipulation of the same, which is discussed in more detail further below.

The roof skin 8 is formed, for example, by a top material in which a rear window 9 is embedded. The rear window 9 is therefore part of the roof skin 8. The rollover protection element 7 is preferably arranged on the motor vehicle 1 in such a manner that, in its protective position AS, it has penetrated through the rear window 9 and, in its inoperative position RS, lies below the rear window 9 or the roof skin 8.

The rollover protection element 7 is arranged under a trim panel 10 which has a passage opening 11 which can be closed and opened up by a covering 12. In its inoperative position RS, the rollover protection element 7 is arranged below the covering 12. The covering 12 can be detached or removed from the opening 11. In a preferred embodiment, the covering 12 can be opened about a pivot axis 13. A covering position 14 of the covering 12 is indicated in FIG. 1 by a solid line. An open position 15 is indicated by a dashed line. The trim panel 10 can be a rear parcel shelf or a top compartment cover.

In order that the covering 12 can be displaced when the rollover protection element 7 is extended from the inoperative position RS into the protective position AS, a lower side 16 of the covering 12 has a contact structure 17 which emerges as at least one projection from the lower side 16 of the covering 12 or is formed integrally therewith and points or is directed toward the rollover protection element 7 in the inoperative position RS. As FIG. 2 shows, the contact structure 17 can be configured as a narrow, elongate web 18 which points toward the rollover protection element 7. In a particularly preferred embodiment, the rollover protection element is a U-shaped bar 19 which is arranged upside down, i.e. downwardly opening, in the vehicle. The bar 19 therefore has upright bar sections 20 and 21 which are connected via a crosspiece 22 which could also be referred to as the basis of the U. The contact structure 17 is attached to the lower side 16 of the covering 12 in such a manner that it interacts with the crosspiece 22 of the bar 19, i.e. during the upwardly directed extension movement (arrow 23) of the bar 19 is struck by the bar 19 such that the covering 12 is displaced by the bar 19 during the upwardly directed extension movement 23, i.e. can be detached from the opening 11. This releases the path for the rollover protection element 7.

The rollover protection element 7 has a manipulation element 24 which is configured as a spike 25 and points toward the covering 12 or the roof skin 8. A manipulation element 24 of this type is basically known from published, European patent application EP 1 510 412 A1 mentioned at the beginning, and therefore, with regard to its function, all that needs to be mentioned here is that, during the pulse-like extension of the rollover protection element 7, it introduces a destructive pulse into the roof skin 8, in particular enters the rear window 9, so that the roof skin or rear window can be destroyed such that the rollover protection element 7 can travel virtually unhindered into its extended protective position AS in which at least the crosspiece 22 protrudes over the plane of the roof skin 8. In the exemplary embodiment shown, the manipulation element is preferably attached in a fixed manner to an upper side 26 of the transversely running crosspiece 22. It would also be conceivable to configure the manipulation element 24 such that it can be displaced relative to the rollover protection element 7, which is likewise known from published, European patent application EP 1 510 412 A1 mentioned at the beginning. It is apparent in particular from FIG. 2 that the manipulation element 24 is arranged in a laterally offset manner in relation to the contact structure 17. It is therefore prevented that, during the extension of the arrow direction 23, the manipulation element can become caught on the lower side 16 of the covering. It can furthermore be seen in FIG. 2 that the bar 19 or the rollover protection element 7 is arranged inclined by an angle $\alpha$ with respect to an imaginary vertical which is formed here by the vertical axis FH of the vehicle, and therefore the transition between crosspiece 22 and upright bar section 20 as it were forms the point or the highest point 27 of the rollover protection element 7, with the manipulation element 24 being arranged adjacent to the highest point 27. The inclined configuration results in that the other transition region between crosspiece 22 and the upright bar section 21 lies at the angle $\alpha$, i.e. somewhat deeper than the highest point 27, with respect to the horizontally running transverse axis FQ of the vehicle.

In the exemplary embodiment shown, the contact structure 17 lies on the lower side 16 of the covering 12 such that its free end 28 comes into contact approximately centrally with the rollover protection element 7, i.e. with the crosspiece 22. The contact structure 17 which is configured as a web 18 runs at an angle $\beta$ with respect to the lower side 16. In the exemplary embodiment shown, the angle $\beta$ is unequal to 90°, but could also assume this value. The angle $\alpha$ between the vertical axis FH of the vehicle and the upright bar section 20 is greater than 0° and less than 90°, preferably less than 45°. In particular, it can be provided that the angle $\alpha$ and the angle $\beta$ assume approximately the same value. The elongate contact structure 17 therefore runs approximately in the direction of the extension movement 23 of the rollover protection element 7.

The contact structure 17 may comprise a plurality of webs 18. In the exemplary embodiment shown, the contact structure 17 is oriented in the direction of the longitudinal axis FL of the vehicle. It would also be conceivable for the contact structure 17 to enclose an angle with respect to said longitudinal axis FL of the vehicle, but the angle is not illustrated here.

The invention claimed is:

1. A motor vehicle, comprising:
   a covering;
   a roof configuration being displaceable between a closed position and an open position and having a roof skin;
   at least one rollover protection element which, in a retracted inoperative position, and concealed under said covering, is moveable, by displacing said covering, into an extended protective position, said rollover protection element having a manipulation element for penetrating said roof skin to reach the extended protective position; and said covering having a lower side facing said rollover protection element and a contact structure for preventing said manipulation element from making contact with said covering disposed on said lower side.

2. The motor vehicle according to claim 1, wherein said covering and said contact structure are produced as a single piece part.

3. The motor vehicle according to claim 1, wherein said contact structure has at least one projection which projects from said lower side of said covering in a direction of said rollover protection element.

4. The motor vehicle according to claim 1, wherein said rollover protection element has an upper side, and said manipulation element is configured as a fixed spike on said upper side of said rollover protection element.

5. The motor vehicle according to claim 1, wherein said manipulation element is attached to said rollover protection element in a laterally offset manner in relation to said contact structure.

6. The motor vehicle according to claim 1, wherein rollover protection element is disposed at an angle with respect to an imaginary vertical parallel to a vertical axis of the motor vehicle.

7. The motor vehicle according to claim 1, wherein said manipulation element is disposed at a highest point of said rollover protection element.

8. The motor vehicle according to claim 1, wherein said contact structure is disposed approximately centrally with respect to said rollover protection element.

9. The motor vehicle according to claim 1, wherein said rollover protection element is at least one roll bar.

* * * * *